April 21, 1970 E. JAULMES 3,507,316
SPOKE WHEEL TIRE WITH INNER TUBE
Filed Aug. 3, 1967

INVENTOR
ERIC JAULMES
BY KARL RATH
ATTORNEY

United States Patent Office 3,507,316
Patented Apr. 21, 1970

3,507,316
SPOKE WHEEL TIRE WITH INNER TUBE
Eric Jaulmes, Paris, France, assignor to Ateliers de la Motobecane, a corporation of France
Filed Aug. 3, 1967, Ser. No. 658,160
Claims priority, application France, Oct. 6, 1966, 78,962
Int. Cl. B60c 25/12
U.S. Cl. 152—366                                   3 Claims

ABSTRACT OF THE DISCLOSURE

In a spoke wheel tire with inner tube the latter is protected against damage by the spokes and mounting or tensioning means therefor, disposed in the bottom or well of the wheel rim, by the provision of a ring-shaped protective spacing strip of elastic material such as rubber, synthetic plastic, etc., being interposed between said well and the tire. In order to provide an all-enclosing space or cavity enveloping the spoke mounting means, said strip is formed with an arcuate or outwardly vaulting cross-section and arranged with its preferably reinforced opposite edges abutting against an intermediate outwardly slanting portion interposed between said well and the tire bead seats of said rim.

---

Figure 1:
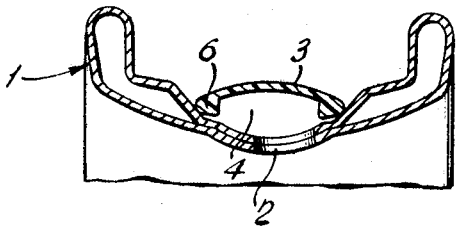

The present invention relates to spoke wheel tires with inner tubes for use in bicycles, motorcycles, etc., more particularly to improve means for protecting the inner tubes of the tires from interference or damage by the spoke mounting and tensioning means of the tire projecting into or disposed within the bottom or well portion of the wheel rims of conventional construction.

It is customary in the fabrication of spoke wheel tires with inner tubes to provide a protective spacer or inlay between the trough-shaped tire rims and the inner tubes of the tires, said spacer serving to protect said tubes from damage by the ends of the spokes projecting through and into the bottom or well portions of the rims, as well as by the mounting or tensioning means or screws therefor also disposed within said rims. There have been used for this purpose in the past strips or plaits of cotton, rubber, rubberized cloth, as well as of synthetic materials produced from sheet stock or by an extrusion process. These protective means have been found only partially effective in protecting the inner tubes of the tires due to failure in securely separating or isolating the tubes from the spokes and their mounting and tensioning means.

Furthermore, in keeping with the prevailing trends of large scale production of bicycles, motorcycles and the like, automatic machines are being introduced to an ever increasing extent for the assembly of the spoke wheel tires, in an effort to achieve increased manufacturing uniformity and speed in the control and adjustment of the spoke tension, as well as for other obvious reasons and requirements.

On the other hand, the use of automatic assembly devices or machines has made it necessary to utilize mounting devices, such as tensioning screws and nuts of an increased height or size, compared with the conventional tensioning and mounting means designed for manual assembly of the tires, in the interest of ensuring a safe seizure by or cooperation with the automatic tools or assembly devices. As a consequence, the tensioning or mounting nuts of the spokes project to a greater extent into the rims of the wheels, whereby to substantially enhance the danger of damage to the inner tubes and to render the conventional protecting means fully unsuitable for providing reliable and safe protection of the tubes.

Accordingly, an important object of the present invention is the provision of improved inner tube protecting means for spoke wheel tires of the referred to type which is substantially devoid of the afore-mentioned and related drawbacks and defects inherent in the known protecting devices, and which will ensure safe and optimum protection of the inner tubes of the tires in a most simple and reliable manner.

A more specific object of the invention is the provision of an improved spacing strip of the referred to type for protecting the inner tubes of a spoke wheel tire, wherein the spoke mounting and tensioning means embodied in the bottom or well of the wheel rim may be of increased size suitable for use in conjunction with automatic assembly methods and operations, substantially without involving the danger of damage to the inner tube of the tire.

Yet another object of the invention is the provision of an inner tube protective strip of the referred to type being closed upon itself and capable of manufacture by extrusion of a plastic or the like material.

Figure 2:
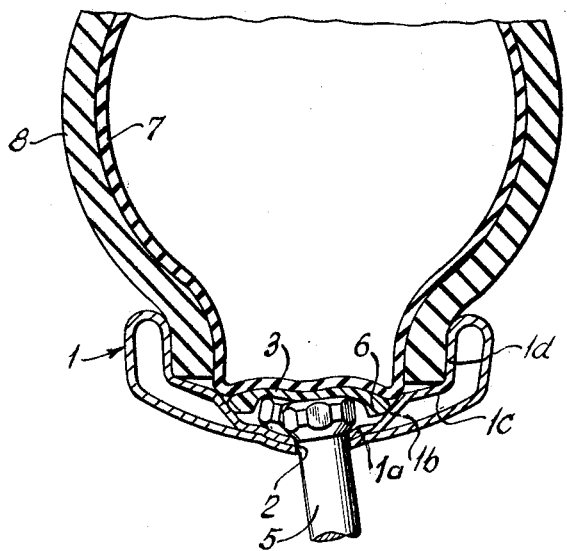

The invention, both as to the foregoing and ancillary objects as well as novel aspects thereof, will be better understood from the following description, taken in conjunction with the accompanying drawing forming part of this specification and wherein:

FIG. 1 is a cross-section of a wheel rim and inner tube protective strip according to the invention positioned therein prior to the mounting of the tube and tire; and FIG. 2 is a cross-section similar to FIG. 1 including the tire and inner tube in the inflated condition.

With the foregoing objects in view, the invention, according to one of its aspects and in a preferred embodiment, involves the provision of an inner tube protective strip of the referred to type for spoke wheel tires, said strip consisting essentially of a plastic or equivalent elastic material, preferably having a cross-section formed with thickened or reinforced edges, and arranged within the well or bottom portion of the trough-shaped wheel rim, with the opposite edges of the strip abutting against the walls of said well, to substantially prevent lateral expansion in the plane of the strip. In producing a ring-shaped strip of this type, the overlapping ends of the strip, cut from sheet stock, may be connected in any suitable manner, such as by a high-frequency or the like welding process, or the strips may be produced by molding or extrusion, in a manner well known and understood.

As a consequence, the protective strip together with the well of the rim form a closed space or cavity enveloping the spokes and mounting means, thus completely separating or isolating the latter from the inner tubes of the tires. In order to ensure an effective and permanent separation, the strips are advantageously formed of an outwardly vaulting shape, that is, in respect to the bottom or well of the rims. Upon inflation of the inner tubes in the mounted position of the tire, the strips, in being prevented from expanding laterally by the side walls of the rims and by the preferably reinforced edges of the strips abutting arch-fashion against said walls, will be urged into a tight engagement with said rims, or slightly distorted in the inward direction, in such a manner as to provide a secure and optimum protection of the tubes from the spokes and associated mounting means, in a manner as will become further apparent as the description proceeds in reference to the drawing.

Referring to the latter, wherein like reference numerals denote like parts in both views thereof, the trough-shaped rim 1 of the tire wheel comprises a bottom or well portion 1a, intermediate slanting portions 1b, tire bead seats 1c, and upper flange portions 1d, adapted for the mounting thereon of an inner tube and tire casing, in a manner well known and more clearly shown at 7 and 8, respectively, in FIG. 2. If desired, the well 1a and intermediate portions 1b, may be combined into a single slanting wall of the rim being engaged by the edges of the protective strip 3 bridging said wall, to form a closed space or cavity 4 by said strip and wall for the reception of the ends of the spokes 5 and mounting or tensioning screws therefore, said spokes being passed through apertures 2 in the bottom or well portion 1a of the rim.

As a consequence, upon inflation of the inner tube 7, the strip or separator 3, being prevented from expanding laterally or in the outward direction by the wall of the well 1a or intermediate portion 1b will be forced into a tight and stable engagement with said wall, to thereby ensure an effective and permanent separation of the inner tube 7 from the spokes 5 and mounting or tensioning means, respectively.

In order to more fully achieve the foregoing results, the strip 3 is formed, according to a further feature of the invention, with thickened or reinforced edges 6, to afford a more intimate engagement with the inner wall of the well or intermediate portion of the rim, and the strip is furthermore formed with an outwardly vaulting cross-section, that is, in respect to the well 1a, as more clearly shown in FIG. 1. Besides, the ribs 6 act to increase the rigidity of the strip or separator, whereby to in turn facilitate handling as well as mounting during assembly of the tires.

As more clearly seen from FIG. 2, inflation of the tube 7 results in a pressure upon the upper or convex side of the strip 3, to cause a flattening of the strip and close engagement between its edges 6 and the inner rim wall 1b, to in turn ensure both efficient and permanent separation of the tube 7 from the spokes 6 and mounting and tensioning means, respectively.

In the foregoing the invention has been described in reference to an illustrative exemplary device. It will be evident, however, that variations and modifications, as well as the substitution of equivalent parts or elements for those shown herein for illustration, may be made without departing from the broader purview and spirit of the invention. The specification and drawing are accordingly to be regarded in an illustrative rather than in a restrictive sense.

I claim:
1. In a spoke wheel tire including a tire casing, an inner tube therein, and a rim, said rim having a lower well portion for the reception of the spoke mounting means, an upper flanged portion adapted for the mounting of said casing, and an intermediate outwardly slanting portion intervening between said lower and upper portions, the improvement consisting in the provision of a ring-shaped protective strip of elastic material having an outwardly vaulted cross-section in respect to and overlying said well portion and being supported exclusively by its opposite edge surfaces abutting arch-fashion against said intermediate rim portion, whereby to provide a firmly closed space by said well and strip, to confine said mounting means in the inflated condition of said tube.

2. In a spoke wheel tire as claimed in claim 1, said strip being formed with reinforced edges engaging said intermediate rim portion.

3. In a spoke wheel tire as claimed in claim 1, said strip consisting of a synthetic plastic.

References Cited
UNITED STATES PATENTS

| 520,901 | 6/1894 | Seely | 152—365 |
| 848,017 | 3/1907 | Ebner | 152—366 |
| 2,087,228 | 7/1937 | Ashworth | 152—365 |
| 3,008,770 | 11/1961 | Mueller | 152—366 |

FOREIGN PATENTS

| 1,256,373 | 3/1961 | France. |
| 339,518 | 8/1959 | Switzerland. |

ARTHUR L. LA POINT, Primary Examiner
C. B. LYON, Assistant Examiner

U.S. Cl. X.R.
152—381